(12) United States Patent
Lechner et al.

(10) Patent No.: US 9,299,089 B2
(45) Date of Patent: Mar. 29, 2016

(54) DYNAMIC ADVERTISEMENT INSERTION DEVICE

(71) Applicant: Verizon Patent and Licensing Inc., Basking Ridge, NJ (US)

(72) Inventors: Marcelo D. Lechner, Burlington, MA (US); Erin Flood, Brooklyn, NY (US); Yehuda Kaplovitz, Spring Valley, NY (US); Daniel S. Elias, Sterling, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 65 days.

(21) Appl. No.: 14/105,480

(22) Filed: Dec. 13, 2013

(65) Prior Publication Data

US 2015/0172737 A1    Jun. 18, 2015

(51) Int. Cl.
*G06Q 30/02* (2012.01)
*H04N 21/81* (2011.01)
*H04N 21/234* (2011.01)
*H04N 21/472* (2011.01)
*H04N 21/84* (2011.01)
*H04N 21/845* (2011.01)

(52) U.S. Cl.
CPC ..... *G06Q 30/0264* (2013.01); *H04N 21/23424* (2013.01); *H04N 21/47202* (2013.01); *H04N 21/812* (2013.01); *H04N 21/84* (2013.01); *H04N 21/8455* (2013.01)

(58) Field of Classification Search
CPC .......................... H04N 21/812; G06Q 30/0264
See application file for complete search history.

(56) References Cited

U.S. PATENT DOCUMENTS

| | | | |
|---|---|---|---|
| 7,930,716 B2 * | 4/2011 | Liga et al. | 725/36 |
| 2002/0042914 A1 * | 4/2002 | Walker et al. | 725/36 |
| 2005/0060229 A1 * | 3/2005 | Riedl et al. | 705/14 |
| 2010/0037253 A1 * | 2/2010 | Sheehan | H04N 21/812 725/31 |
| 2010/0146542 A1 * | 6/2010 | Weihs et al. | 725/34 |
| 2011/0264530 A1 * | 10/2011 | Santangelo et al. | 705/14.64 |
| 2012/0096486 A1 * | 4/2012 | Stallard et al. | 725/32 |
| 2012/0109726 A1 * | 5/2012 | Ruffini | G06Q 30/0241 725/32 |
| 2012/0185895 A1 * | 7/2012 | Wong et al. | 725/32 |

OTHER PUBLICATIONS

Wikipedia, "Nielsen ratings", http://en.wikipedia.org/w/index.php?title=Nielsen_ratings&oldld=582168211, Nov. 18, 2013, 10 pages.

(Continued)

*Primary Examiner* — Pankaj Kumar
*Assistant Examiner* — Alexander Boyd (57) ABSTRACT

A device is configured to receive scheduling information associated with a program. The device is configured to determine a time break, corresponding to an advertisement, associated with the program. The device is configured to receive guide information associated with the program. The device is configured to identify the program based on the guide information and the scheduling information, and generate an advertisement map based on identifying the program and based on the time break. The advertisement map may include information that identifies the time break and the program. The device is configured to provide the advertisement map to a dynamic advertisement insertion system to permit the dynamic advertisement insertion system to replace the advertisement during a subsequent playing of the program.

20 Claims, 7 Drawing Sheets

(56) References Cited

OTHER PUBLICATIONS

Wikipedia, "Audience Measurement", http://en.wikipedia.org/w/index.php?title=Audience_measurement&oldId=585746654, Dec. 12, 2013, 11 pages.

Wikipedia, "Cue tone", http://en.wikipedia.org/w/index.php?title=Cue_tone&oldId=492310477, May 13, 2012, 1 page.

Wikipedia, "Video on demand", http://en.wikipedia.org/w/index.php?title=Video_on_demand&oldId=584394660, Dec. 3, 2013, 8 pages.

* cited by examiner

DYNAMIC ADVERTISEMENT INSERTION DEVICE

BACKGROUND

A service provider (e.g., broadcast television provider, a cable television provider, a satellite television provider, etc.) may provide a program (e.g., a television show, a movie, etc.) to one or more user devices associated with one or more viewers. The program may be associated with content and time breaks in the content for advertisements (e.g., commercial breaks).

DETAILED DESCRIPTION OF PREFERRED EMBODIMENTS

The following detailed description of example implementations refers to the accompanying drawings. The same reference numbers in different drawings may identify the same or similar elements.

A service provider (e.g., a broadcast television provider, a cable television provider, a satellite television provider, etc.) may broadcast a program that includes content (e.g., a television show, a movie, etc.) and one or more breaks in the content for advertisements (e.g., a commercial break). The program may be assessed by an audience measurement system (e.g., a system for determining how many people have viewed the advertisements associated with the program during a rating period). A broadcaster (e.g., a television broadcaster) may use information gathered by the audience measurement system (e.g., viewership) to determine a price associated with the advertisements, an effectiveness associated with the advertisements, or the like.

In some instances, the service provider may play the program subsequent to an original broadcast (e.g., via an Internet streaming service, a video on demand ("VOD") service, a digital video recorder ("DVR") service, a network DVR ("NDVR") service, etc.). In order to permit the audience measurement system to determine viewership associated with the advertisements, the service provider may need to play the same advertisements in the same manner (e.g., in the same order and/or during the same breaks) as originally aired. However, not all advertisements associated with the program may need to be displayed during the subsequent playing of the program. For example, the program may include regional advertisements (for which the viewership must be assessed) and local advertisements (for which the viewership need not be assessed). A service provider may desire to replace the local advertisements (e.g., during a subsequent playing of the program) with new advertisements, in order to sell additional advertisement time, in order to provide new content to a viewer, or the like.

Implementations described herein may allow a matching device to identify those advertisements, associated with a program, which may be replaced during a subsequent playing of the program such that other advertisements associated with the program may be assessed for viewership.

Figure 1:
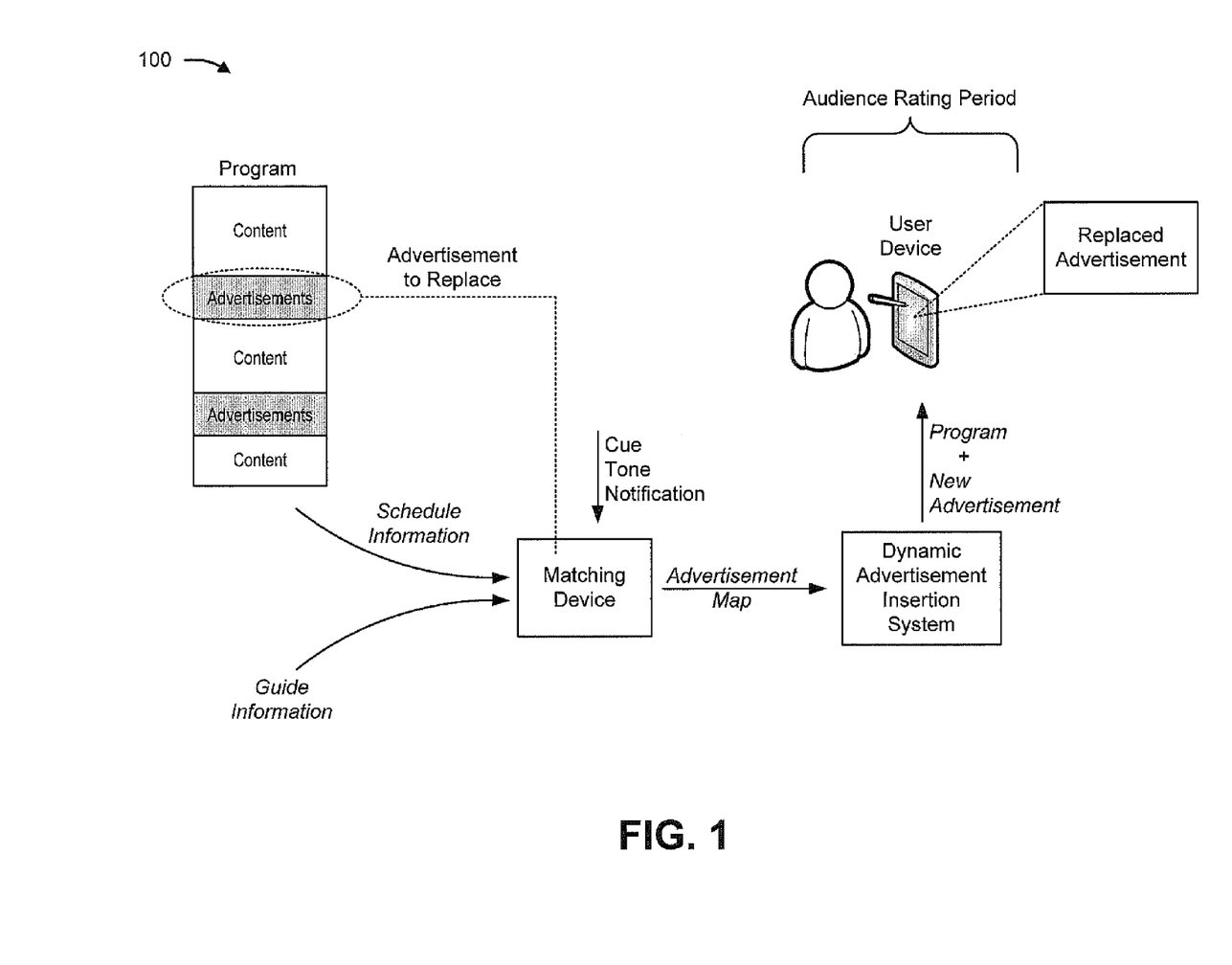
FIG. 1 is a diagram of an overview of an example implementation described herein.

FIG. 1 is a diagram of an overview of an example implementation 100 described herein. As shown in FIG. 1, example implementation 100 may include a program, a matching device, a dynamic advertisement insertion system, and a user device.

As shown in FIG. 1, the program may include a segment of content and associated advertisements broadcast by a service provider (e.g., a cable television provider). The program may include advertisements that must be displayed during subsequent playing of the program in order to measure viewership of the advertisements during a rating period. The program may also include advertisements that may be replaced during the subsequent playing of the program. The matching device may receive scheduling information that identifies when a pause in the content (e.g. a time break) occurs to permit display of one or more of the advertisements. The matching device may receive guide information that includes a broadcast schedule for a set of programs including the program. The matching device may also receive a notification of when a cue tone occurred (e.g., indicating a particular time, during the time break, when the advertisement was displayed). Based on the scheduling information and the guide information, the matching device may identify the program.

As further shown in FIG. 1, based on the scheduling information, the guide information, and the cue tone notification, the matching device may generate an advertisement map, and may provide the advertisement map to the dynamic advertisement insertion system. The advertisement map may identify when an advertisement may be played (e.g., inserted) during a subsequent playing of the program. Based on a request from a user device, the dynamic advertisement insertion system may provide the program to the user device, along with a new advertisement (e.g., according to the advertisement map). The new advertisement may be provided to the user device instead of the advertisement (e.g., the original advertisement). In this manner, the dynamic advertisement insertion system may provide new advertisements to viewers during subsequent playing of the program while displaying other advertisements (e.g., as originally broadcast) that must be provided in order to measure viewership during the rating period.

Figure 2:
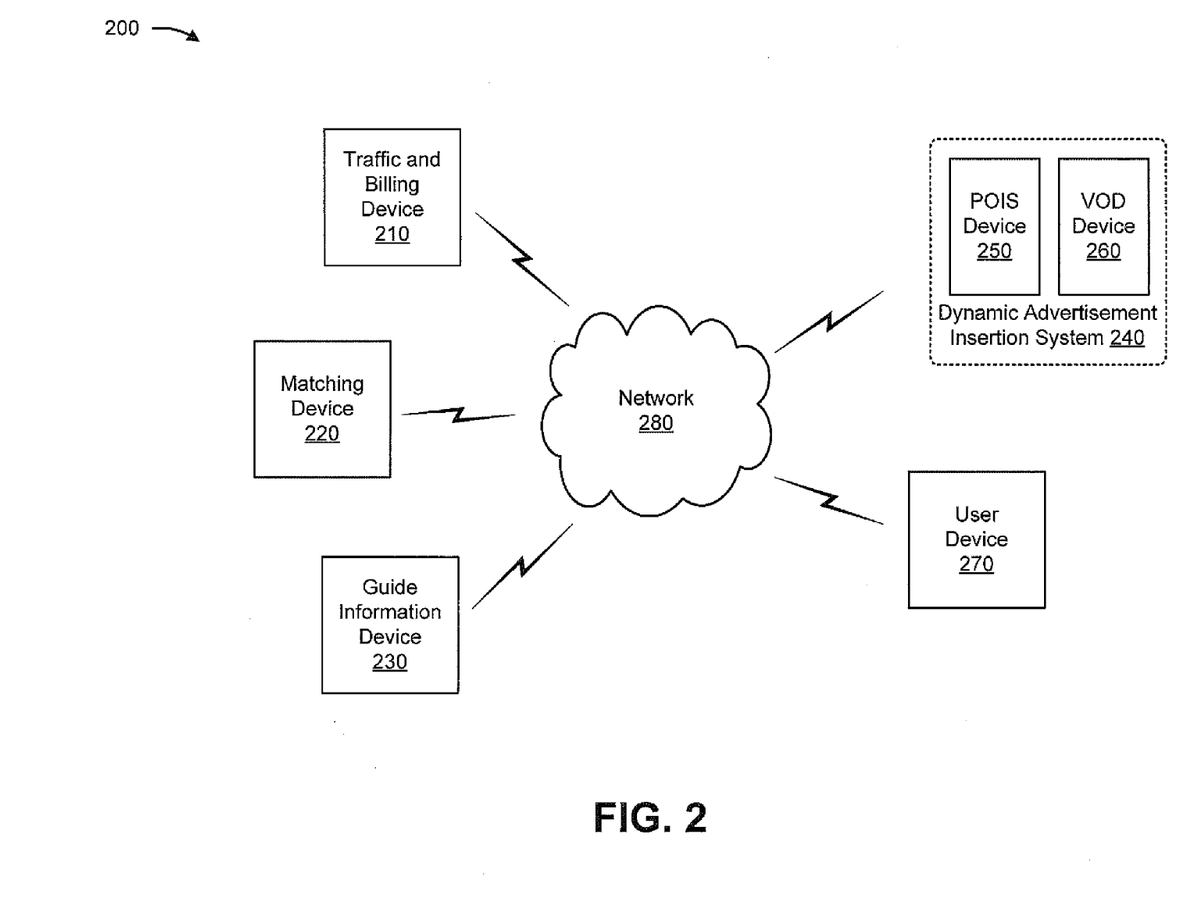
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include traffic and billing device 210, matching device 220, guide information device 230, dynamic advertisement insertion system 240, placement opportunity information system ("POIS") device 250 (hereinafter referred to as "POIS device 250"), video on demand ("VOD") device 260 (hereinafter referred to as "VOD device 260"), user device 270, and network 280. Devices of environment 200 may interconnect via wired connections, wireless connections, or a combination of wired and wireless connections.

Traffic and billing device 210 may include a device capable of receiving, processing, storing, and/or providing information, such as information associated with a program. For example, traffic and billing device 210 may include one or more computation or communication devices, such as a server device. Traffic and billing device 210 may receive information from and/or transmit information to matching device 220, guide information device 230, dynamic advertisement information system 240, POIS device 250, VOD device 260, and/or user device 270.

Matching device 220 may include a device capable of identifying a program for which advertisements may be replaced. For example, matching device 220 may include a computing device, (e.g., a desktop computer, a laptop computer, a tablet computer, a handheld computer, etc.), a server device, or a similar device. Matching device 220 may receive information from and/or transmit information to traffic and billing device 210, guide information device 230, dynamic advertisement information system 240, POIS device 250, VOD device 260, and/or user device 270.

Guide information device 230 may include a device capable of receiving, processing, storing, and/or providing information, such as information associated with a program. For example, guide device 230 may include one or more computation or communication devices, such as a server device. Guide information device 230 may receive information from and/or transmit information to traffic and billing device 210, matching device 220, dynamic advertisement information system 240, POIS device 250, VOD device 260, and/or user device 270.

Dynamic advertisement insertion system 240 may include one or more devices capable of replacing an advertisement in a program during a subsequent playing. Dynamic advertising insertion system 240 may include POIS device 250 and/or VOD device 260. POIS device 250 may include a device capable of replacing an advertisement associated with a program. For example, POIS device 250 may include a computing device (e.g., a desktop computer, a laptop computer, a tablet computer, a handheld computer, etc.), a server device, or a similar device. VOD device 260 may include a device capable of receiving, processing, storing, and/or providing a program for subsequent playing. For example, VOD device 260 may include a computing device (e.g., a desktop computer, a laptop computer, a tablet computer, a handheld computer, etc.), a server device (e.g., a video on demand server, a webserver, etc.), a digital video recorder ("DVR"), a network digital video recorder ("NDVR"), or a similar device. Dynamic advertisement insertion system 240 may receive information from and/or transmit information to traffic and billing device 210, matching device 220, guide information device 230, and/or user device 270.

User device 270 may include a device capable of receiving and/or displaying a program. For example, user device 270 may include a computing device (e.g., a desktop computer, a laptop computer, a tablet computer, a handheld computer, etc.), a smartphone, a television, or a similar device. User device 270 may receive information from and/or transmit information to traffic and billing device 210, matching device 220, guide information device 230, dynamic advertisement information system 240, POIS device 250, and/or VOD device 260.

Network 280 may include one or more wired and/or wireless networks. For example, network 280 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
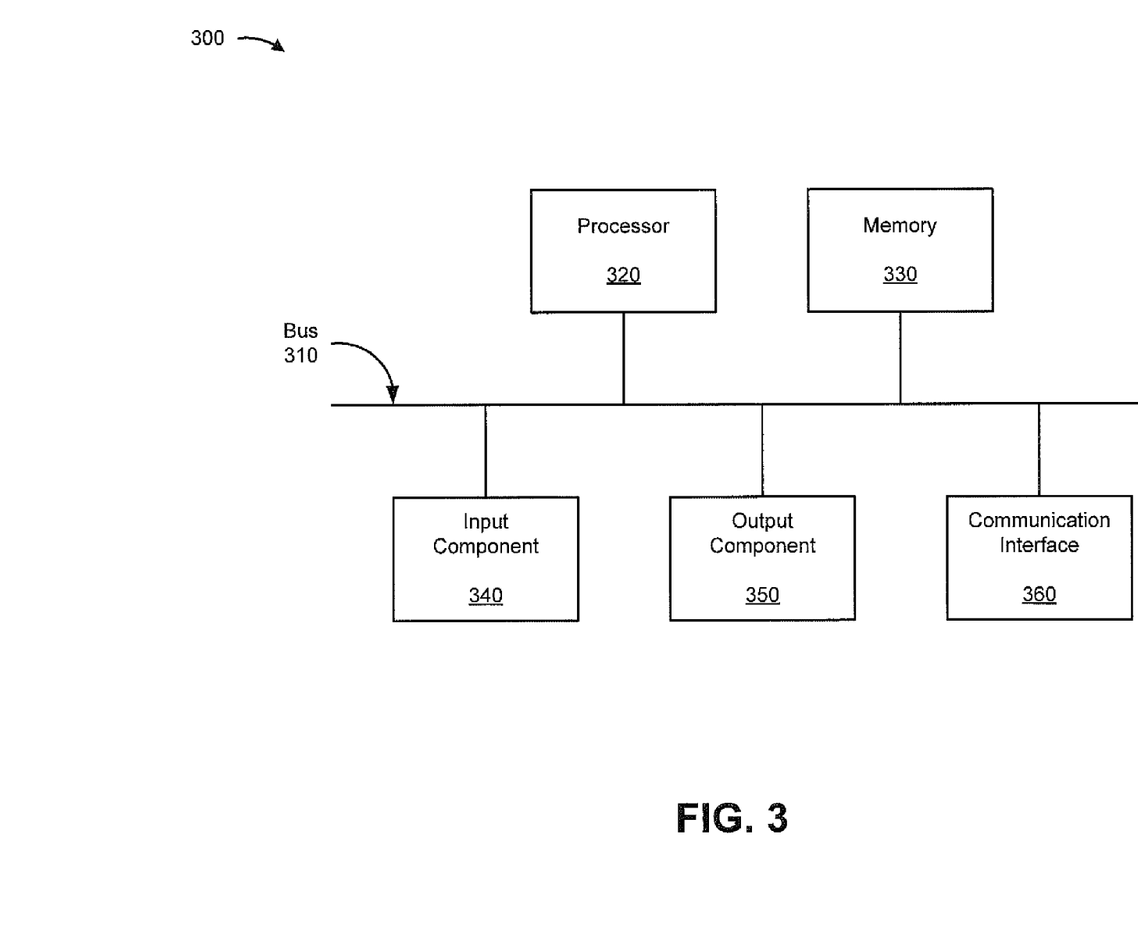
FIG. 3 is a diagram of example components of one or more devices of FIG. 2.

FIG. 3 is a diagram of example components of a device 300. Device 300 may correspond to traffic and billing device 210, matching device 220, guide information device 230, POIS device 250, VOD device 260, and/or user device 270. Additionally, or alternatively, each of traffic and billing device 210, matching device 220, guide information device 230, POIS device 250, VOD device 260, and/or user device 270 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
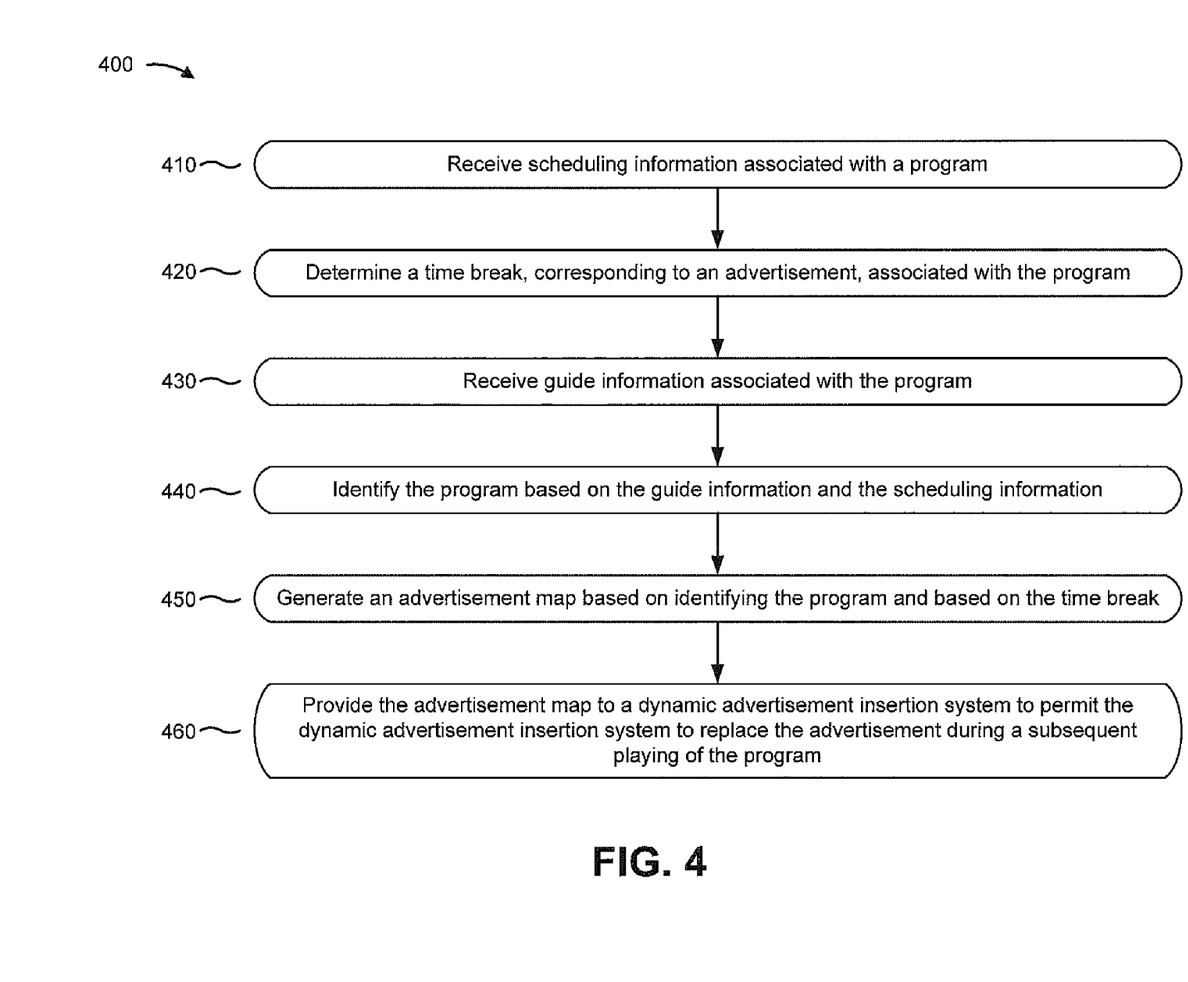
FIG. 4 is a flow chart of an example process for identifying advertisement insertion opportunities associated with a program.

FIG. 4 is a flow chart of an example process 400 for identifying advertisement insertion opportunities associated with a program. In some implementations, one or more process blocks of FIG. 4 may be performed by matching device 220. Additionally, or alternatively, one or more process blocks of FIG. 4 may be performed by another device or a group of devices separate from or including matching device 220, such as traffic and billing device 210, guide information device 230, POIS device 250, VOD device 260, and/or user device 270.

As shown in FIG. 4, process 400 may include receiving scheduling information associated with a program (block 410). For example, matching device 220 may receive the scheduling information from traffic and billing device 210.

In some implementations, the program may include a segment of content and associated advertisements broadcast by a service provider (e.g., a broadcast television provider, a cable television provider, a satellite television provider, etc.). For example, the program may include a television program (e.g., a television show), a movie, a sporting event, or the like. The program may be associated with one or more time breaks (e.g., commercial breaks) during which content associated with the program may be stopped (e.g., paused) to permit one or more advertisements (e.g., commercials, announcements, etc.) to be presented.

In some implementations, the program may be associated with multiple advertisements. For example, a program of a particular time period (e.g., 30 minutes) may be associated with a time period for content (e.g., 22 minutes) and a time period for advertisements (e.g., 8 minutes). The time period for advertisements may be divided among multiple advertisements of the same or different periods of time (e.g., 45 seconds, 30 seconds, 10 seconds, etc.).

In some implementations, the advertisements may be associated with a particular broadcast area. For example, the advertisement may include a regional advertisement (e.g., an advertisement broadcast to a particular region), a local advertisement (e.g., an advertisement broadcast to a particular locality), or the like (e.g., permitting viewers of the same region but different localities to receive the same regional advertisements and different local advertisements).

The scheduling information may include information that identifies when a pause in the content of the program occurs to permit presentation of one or more advertisements (e.g., when a commercial break occurs). For example, the scheduling information may identify a time break. The time break may include a range of time (e.g., 10 minutes and 5 seconds to 10 minutes and 50 seconds), measured from the start of the program, corresponding to one or more advertisements. In some implementations, the scheduling information may identify a duration of the time break. Additionally, or alternatively, the scheduling information may identify a quantity of time breaks associated with the program.

In some implementations, the scheduling information may identify a channel associated with the program, a network associated with the program, a broadcaster associated with the program, or the like. Additionally, or alternatively, the scheduling information may identify a particular advertisement, presented during the time break, based on an advertisement identifier (e.g., a name of the advertisement), and/or an advertiser identifier (e.g., a name of the advertiser).

In some implementations, the scheduling information may include a schedule. For example, the scheduling information may include a schedule that complies with a particular standard, such as a Cable Computerized Management Systems ("CCMS") schedule format.

In some implementations, a service provider may insert one or more advertisements during broadcast of the program (e.g., based on the scheduling information). For example, the scheduling information may identify a time break (e.g., 5 minutes to 5 minutes and 30 seconds) during which a local service provider may play a local advertisement. Based on the scheduling information, the local service provider may play the local advertisement during the time break. In some implementations, the local service provider may play the local advertisement based on a cue tone (e.g., an audio tone used to indicate an action). For example, the time break may include a window of time for which to play the local advertisement. A device associated with a regional service provider may provide a cue tone to a device associated with the local service provider indicating that the local service provider is to play the local advertisement, and the local service provider may play the local advertisement.

In this manner, the program may include regional advertisements and local advertisements broadcast during an original broadcast of the program, and the scheduling information may identify time breaks associated with one or more advertisements associated with the program.

As further shown in FIG. 4, process 400 may include determining a time break, corresponding to an advertisement, associated with the program (block 420). For example, matching device 220 may determine the time break associated with a local advertisement inserted into the program when the program was first broadcast (e.g., based on the scheduling information provided by traffic and billing device 210).

In some implementations, the program may be assessed by an audience measurement system. The audience measurement system may include a system for determining how many people have viewed a particular program (e.g., a particular segment of content, a particular advertisement, etc.). In some implementations, the audience measurement system may determine a rating (e.g., a Nielsen rating) that represents viewership associated with the program. In some implementations, the rating may include viewership during an initial broadcast of the program as well as viewership during subsequent viewings of the program (e.g., via the Internet, VOD service providers, DVR, NDVR, etc.) during a rating period (e.g., 3 days after the initial broadcast, 7 days after the initial broadcast, etc.).

In some implementations, matching device 220 may determine a time break associated with an advertisement that may be replaced during a subsequent playing of the program (e.g., via dynamic advertisement insertion system 240, POIS device 250, VOD device 260, etc.). For example, the program may include one or more regional advertisements associated with one or more regional advertisers who desire to have the regional advertisements assessed during the rating period (e.g., by the audience measurement system). The program may also include a local advertisement that need not be assessed during the rating period. Matching device 220 may determine a time break associated with the local advertisement based on determining that the local advertisement does not need to be assessed during the rating period (e.g., determining that the local advertisement may be replaced during subsequent playing of the program).

In some implementations, matching device 220 may determine a start time associated with the local advertisement. For example, the local advertisement may be associated with a cue tone. The cue tone may be associated with a particular time (e.g., within the time break) that a local service provider played the local advertisement (e.g., when originally broadcast). Matching device 220 may receive information that identifies the particular time (e.g., associated with the cue tone) from a device associated with a content provider (e.g., a local service provider, a regional service provider, a provider of the program, etc.). Based on the particular time (e.g., of the cue tone), matching device 220 may determine the start time of the local advertisement. In some implementations, the particular time may include a duration of time relative to the program (e.g., as measured from the start of the program).

As further shown in FIG. 4, process 400 may include receiving guide information associated with the program (block 430). For example, matching device 220 may receive the guide information from guide information device 230.

The guide information may include information that identifies programming information associated with a set of programs (e.g., including the program). For example, the guide information may include a broadcast schedule that identifies dates, times, channels, etc. that the set of programs have been and/or will be broadcast.

In some implementations, the guide information may include a program identifier. The program identifier may include one or more characters (e.g., letters, numbers, symbols, etc.) that identify the program. In some implementations, the program identifier may include a name associated with the program. For example, the program may be associated with a television show, and the program identifier may include a name of the television show, a title of an episode of the television show, an episode name or number associated with the television show, or the like.

In some implementations, the guide information may include information that identifies a provider of the program (e.g., a particular network). For example, the guide information may include a provider identifier, which includes one or more characters that identify the provider associated with the program.

In some implementations, the guide information may identify a day, a date, and/or a time that the program was broadcast (e.g., originally broadcast). Additionally, or alternatively, the guide information may identify a channel associated with the program, a network associated with the program, a broadcaster associated with the program, or the like.

In some implementations, the guide information may correspond to information associated with dynamic advertisement insertion system 240. For example, the guide information may include a device identifier that matches a device identifier used by dynamic advertisement insertion system 240 (e.g., to locate content associated with VOD device 260 that corresponds to the program).

As further shown in FIG. 4, process 400 may include identifying the program based on the guide information and the scheduling information (block 440). For example, matching device 220 may identify the program associated with the local advertisement (e.g., the local advertisement that may be replaced during subsequent playing of the program during a rating period).

In some implementations, matching device 220 may identify the program by matching information associated with the guide information with information associated with the scheduling information. For example, the scheduling information may identify that a time break associated with a particular program (e.g., corresponding to a local advertisement) occurred on a particular date (e.g., August 7$^{th}$), at a particular time (e.g., 3:10 P.M.), and on a particular channel (e.g., channel 7). Based on the guide information, matching device 220 may determine that the particular date, the particular time, and the particular channel correspond to a program of a particular title (e.g., that a program broadcast on August 7$^{th}$ from 3:00 P.M. to 3:30 P.M. on channel 7 corresponds to the program of the particular title). Thus, matching device 220 may determine the particular title associated with the particular program (e.g., associated with the scheduling information). In this manner, matching device 220 may identify the program for which the advertisement (e.g., the local advertisement) may be replaced during subsequent playing (e.g., by dynamic advertising insertion system 240, POIS device 250, VOD device 260, etc.).

As further shown in FIG. 4, process 400 may include generating an advertisement map based on identifying the program and based on the time break (block 450). For example, matching device 220 may generate an advertisement map that identifies a time break for which dynamic advertisement insertion system 240 may replace the advertisement.

In some implementations, the advertisement map may include a schedule that identifies advertisement placement opportunities for dynamic advertisement insertion system 240. For example, the advertisement map may identify a time break, associated with the program, for which dynamic advertisement insertion system 240 may replace an advertisement (e.g., may play a different advertisement instead during a subsequent playing of the program).

In some implementations, the advertisement map may identify the program (e.g., a name of the program, a title of the program, etc.), a broadcaster associated with the program, a channel associated with the program, or the like. Additionally, or alternatively, the advertisement map may identify the time break, a duration of the time break, etc. In some implementations, the advertisement may identify the time break based on a cue tone associated with the advertisement (e.g., based on a particular time at which the cue tone indicated that the advertisement was originally broadcast).

In some implementations, the advertisement map may include a program identifier that corresponds to a particular program identifier associated with dynamic advertisement insertion system 240. For example, dynamic advertisement insertion system 240 may receive the program (e.g., from a broadcast provider) associated with a particular program identifier (e.g., generated by the broadcast provider to identify the program). Matching device 220 may generate a program identifier that matches the particular program identifier, thus permitting dynamic advertisement insertion system 240 to associate the program with the advertisement that may be replaced (e.g., during subsequent playing of the program).

In some implementations, the advertisement map may identify time breaks where advertisements may not be replaced (e.g., by dynamic advertisement insertion system 240). For example, the advertising map may identify one or more time breaks associated with advertisements being assessed by the audience measurement system (e.g., during the rating period).

As shown in FIG. 4, process 400 may include providing the advertisement map to a dynamic advertisement insertion system to permit the dynamic advertisement insertion system to replace the advertisement during a subsequent playing of the program (block 460). For example, matching device 220 may provide the advertisement map to dynamic advertisement insertion system 240 (e.g., by providing the advertisement map to POIS device 250 and/or VOD device 260).

In some implementations, matching device 220 may update an advertisement map associated with dynamic advertisement insertion system 240. For example, dynamic advertisement insertion system 240 may be associated with an advertisement map for the program (e.g., an advertisement map that identifies time breaks associated with the program). Matching device 220 may modify the advertisement map to identify those time breaks for which an advertisement may be replaced, and those time breaks for which an advertisement may not be replaced.

In some implementations, VOD device 260 may receive the program (e.g., from a broadcast provider), and may store the program in a data structure associated with VOD device 260. VOD device 260 may receive a request, from user device 270, to provide the program. Based on the request, VOD device 260 may stream the program (e.g., via network 280) to user device 270. Based on the advertisement map, POIS device 250 may identify a time break, associated with the program, for which the advertisement may be replaced. During the time break, POIS device 250 may cause a new advertisement to be provided to user device 270. User device 270 may present the program, as well as the new advertisement, on a display associated with user device 270.

In some implementations, dynamic advertisement insertion system 240 may provide the new advertisement to user device 270 based on a location of user device 270, based on information associated with a user of user device 240 (e.g., demographic information), based on information associated with an account of the user and/or user device 270, or the like.

In this manner, dynamic advertisement insertion system 240 may provide a program to user device 270 that includes advertisements as originally broadcast (e.g., regional advertisements) as well as new advertisements (e.g., replacing local advertisements).

Although FIG. 4 shows example blocks of process 400, in some implementations, process 400 may include additional blocks, fewer blocks, different blocks, and/or differently arranged blocks than those depicted in FIG. 4. Additionally, or alternatively, two or more of the blocks of process 400 may be performed in parallel.

Figure 5A:
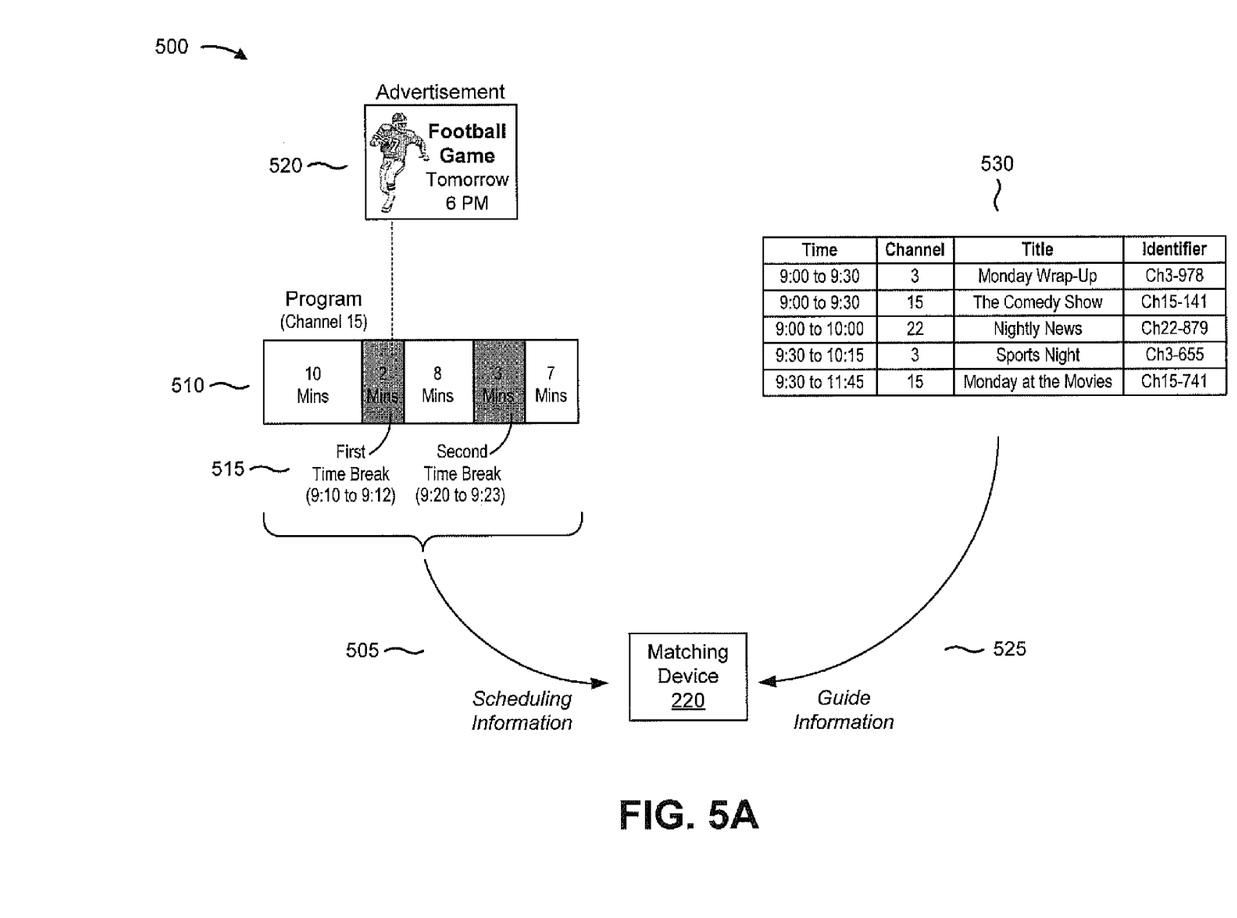
FIGS. 5A-5C are diagrams of an example implementation relating to the example process shown in FIG. 4.
Figure 5B:
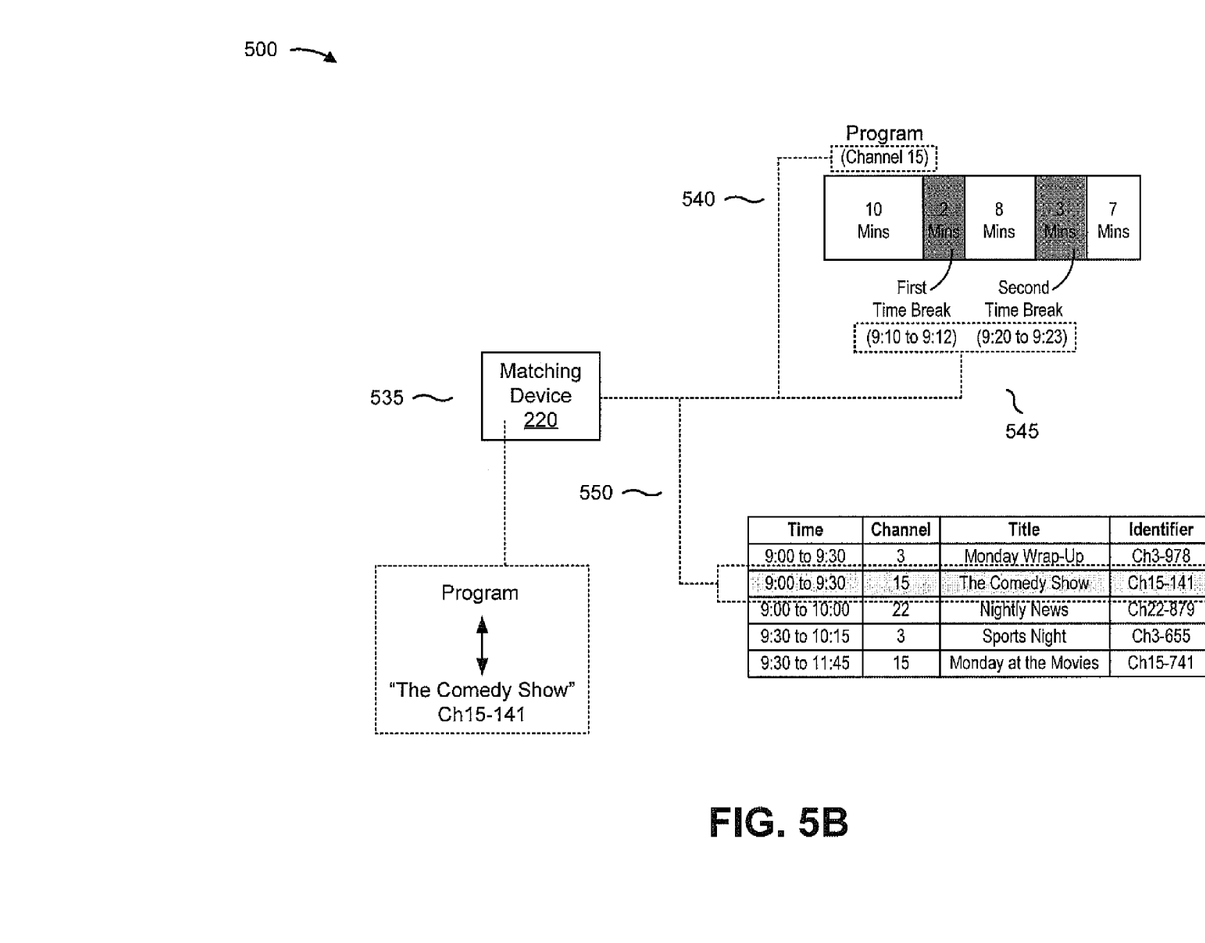
Figure 5C:
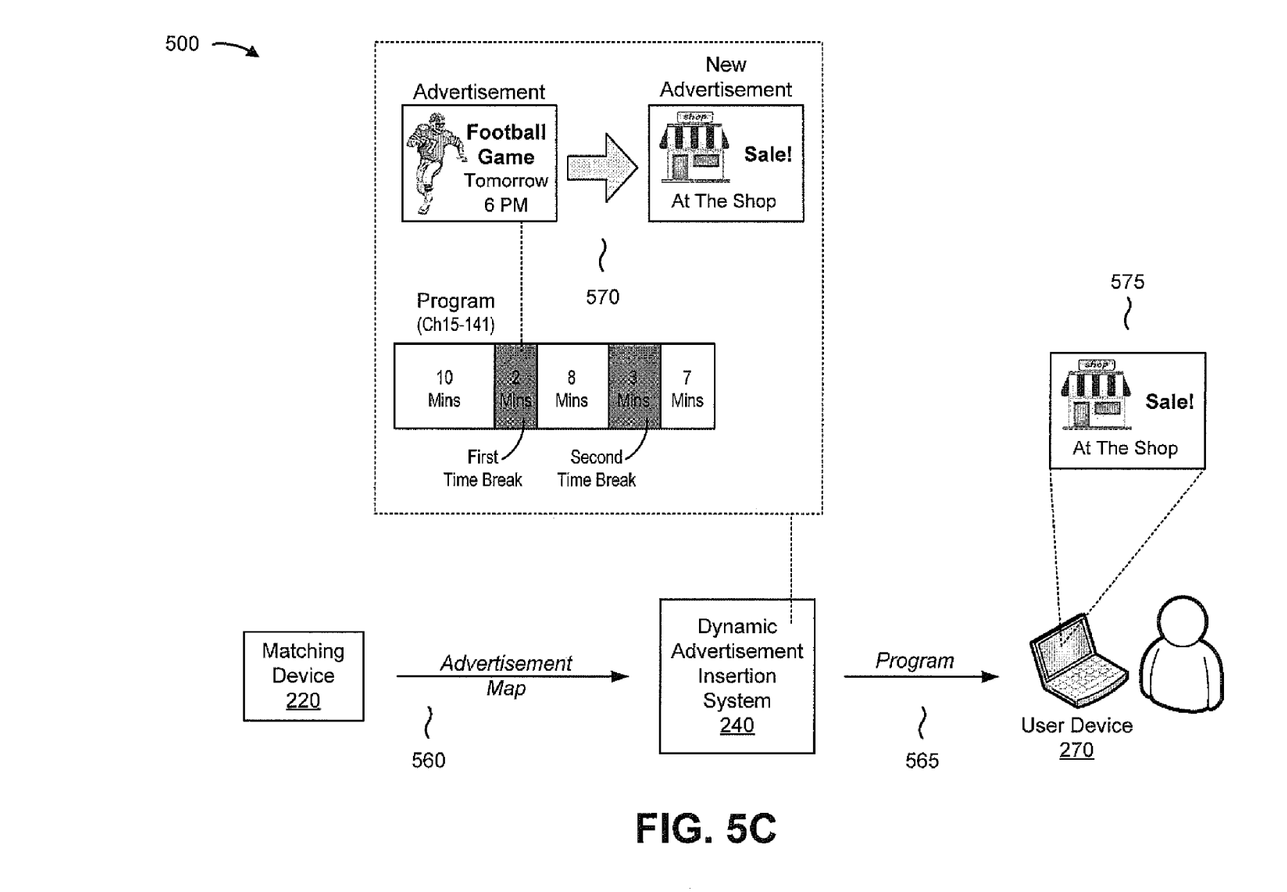

FIGS. 5A-5C are diagrams of an example implementation 500 relating to process 400 (FIG. 4). In example implementation 500, matching device 220 may identify an advertisement (e.g., associated with a program) that may be replaced, while permitting other advertisements (e.g., associated with the program) to remain so as to be assessed for viewership.

As shown in FIG. 5A, and by reference number 505, matching device 220 may receive scheduling information (e.g., from traffic and billing device 210, not shown) associated with a program. Assume that the program includes a 30 minute television program broadcast on a Saturday evening on a particular channel (e.g., channel 15). As shown by reference number 510, assume that the program includes 10 minutes of content, followed by 2 minutes of advertising (e.g., corresponding to a first time break), followed by 8 minutes of content, followed by 3 minutes of advertising (e.g., corresponding to a second time break), followed by 7 minutes of content. Assume that the first time break occurs from 9:10 to 9:12 PM, and that the second time break occurs at 9:20 to 9:23 PM, as shown by reference number 515. As shown by reference number 520, assume that the first time break corresponds to an advertisement for a football game (e.g., "Football Game Tomorrow 6 PM"). Assume that matching device 220 may determine a particular time, during the first time break, when the advertisement begins playing based on receiving a cue tone notification (e.g., an indication of when a cue tone played to display the advertisement when originally broadcast). Further, assume that the advertisement is a local advertisement that may be replaced when the program is subsequently played.

As shown by reference number 525, matching device 220 may receive guide information (e.g., from guide information device 230, not shown). As shown by reference number 530, the guide information may include a broadcast schedule for Saturday evening. The guide information may identify a set of programs and corresponding times (e.g., broadcast times), channels (e.g., broadcast channels), and identifiers associated with the set of programs.

As shown in FIG. 5B, and by reference number 535, matching device 220 may compare the scheduling information and the guide information. As shown by reference number 540, matching device 220 may identify that the program (e.g., associated with the scheduling information) was broadcast on the particular channel (e.g., channel 15). As shown by reference number 545, matching device 220 may determine that the first break occurred from 9:10 to 9:12 PM, and that the second break occurred from 9:20 to 9:23 PM.

As shown by reference number 550, matching device 220 may identify a program (e.g., of the set of programs associated with the guide information) that was broadcast on the particular channel identified by the scheduling information (e.g., channel 15) and during a time period (e.g., 9:00 to 9:30 PM) that includes the first time break (e.g., 9:10 to 912 PM) and the second time break (e.g., 9:20 to 9:23 PM). As shown by reference number 555, based on the scheduling information and the guide information, matching device 220 may identify the program (e.g., identified by the scheduling information) with a title (e.g., "The Comedy Show") and a program identifier (e.g., "Ch15-141").

As shown in FIG. 5C, and by reference number 560, matching device 220 may determine an advertisement map that identifies the advertisement associated with the first time break (e.g., associated with the program) as an advertisement that may be replaced (e.g., when subsequently playing the program). The advertisement map may also identify advertisements associated with the second time break as advertisements that may not be replaced (e.g., in order to be assessed by an audience measurement system). Matching device 220 may provide the advertisement map to dynamic advertisement insertion system 240.

As shown by reference number 565, assume that user device 270 has requested to receive the program (e.g., via a video stream) two days later. Dynamic advertisement insertion system 240 may provide the program. As shown by reference number 570, dynamic advertisement insertion system 240 may replace the first advertisement with a new advertisement (e.g., "Sale! At The Shop") during the first time break. User device 270 may display the new advertisement during the first time break, as shown by reference number 575.

As indicated above, FIGS. 5A-5C are provided merely as an example. Other examples are possible and may differ from what was described with regard to FIGS. 5A-5C.

Implementations described herein may allow a matching device to identify those advertisements, associated with a program, which may be replaced during a subsequent playing of the program such that other advertisements associated with the program may be assessed for viewership.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein. In some implementations, the user interfaces may be customizable by a device or a user. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   a memory; and
   one or more processors to:
      receive scheduling information associated with a program;
      identify an advertisement that is included in the program and for which viewership does not need to be assessed during a rating period;
      determine a time break, corresponding to the advertisement, associated with the program based on the scheduling information;
      receive guide information associated with the program;
      identify the program based on the scheduling information and the guide information;
      receive a notification of a cue tone that indicates a time that a local service provider played the advertisement during the time break;
      generate an advertisement map based on identifying the program, the time break, and the notification of the cue tone,
         the advertisement map including information that identifies the time break and the program; and
      provide the advertisement map to a dynamic advertisement insertion system to permit the dynamic advertisement insertion system to replace the advertisement during a subsequent playing of the program.

2. The device of claim 1,
   where the advertisement map is a first advertisement map, and
   where the one or more processors, when providing the advertisement map to the dynamic advertisement insertion system, are to:
      modify a second advertisement map associated with the dynamic advertisement insertion system so that the second advertisement map identifies the time break and the program.

3. The device of claim 1,
   where the program further includes a plurality of advertisements for which viewership is to be determined by an audience measurement system, and
   where the one or more processors, when identifying the advertisement, are to:
      determine that the advertisement is not one of the plurality of advertisements, and
      determine that the advertisement does not need to be assessed for viewership during the rating period based on determining that the advertisement is not one of the plurality of advertisements.

4. The device of claim 3,
   where the plurality of advertisements are regional advertisements that are broadcast to a particular region, and
   where the advertisement is a local advertisement that is broadcast to a particular locality that is located within the particular region.

5. The device of claim 1,
   where the one or more processors, when determining the time break, are to:
      determine a time period associated with the time break, and
   where the one or more processors, when providing the advertisement map to the dynamic advertisement insertion system, are to:
      provide the advertisement map to the dynamic advertisement insertion system to cause the dynamic advertisement insertion system to replace the advertisement with a new advertisement associated with the time period.

6. The device of claim 1,
   where the program is a first program,
   where the one or more processors, when receiving the scheduling information, are to:
      determine a first channel associated with the first program, and
      determine a first time associated with the time break;
   where the one or more processors, when receiving the guide information, are to:
      identify a program identifier associated with a second program,
         the second program being associated with a second channel and a time range, and
   where the one or more processors, when identifying the first program, are to:
      associate the program identifier with the first program based on determining that the first channel matches the second channel and that the first time is within the time range.

7. The device of claim 1,
where the advertisement is a first advertisement,
where the time break is a first time break,
where the one or more processors are further to:
   determine a second time break associated with a second advertisement that is included in the program,
where the one or more processors, when generating the advertisement map, are to:
   generate the advertisement map based on identifying the program, the first time break, the notification of the cue tone, and the second time break, and
where the advertisement map indicates that the dynamic advertisement insertion system should not replace the second advertisement during the subsequent playing of the program.

8. A computer-readable medium storing instructions, the instructions comprising:
one or more instructions that, when executed by one or more processors, cause the one or more processors to:
   receive scheduling information associated with a program;
   determine that an advertisement, included in the program, does not need to be assessed during a rating period;
   determine a time break, corresponding to the advertisement, associated with the program based on the scheduling information and based on determining that the advertisement does not need to be assessed during the rating period;
   receive guide information associated with the program;
   receive a notification of a cue tone that indicates a time, during the time break, when the advertisement was previously broadcast;
   determine an advertisement map based on the scheduling information, the guide information, and the notification of the cue tone,
      the advertisement map including information that identifies the time break and the program; and
   provide the advertisement map to a dynamic advertisement insertion system to permit the dynamic advertisement insertion system to replace the advertisement with a new advertisement during a subsequent playing of the program.

9. The computer-readable medium of claim 8, where the guide information includes a broadcast schedule for a set of programs that include the program.

10. The computer-readable medium of claim 8, where the one or more instructions, that cause the one or more processors to provide the advertisement map, cause the one or more processors to:
   determine the rating period associated with determining a viewership associated with a plurality of advertisements included in the program; and
   provide the advertisement map based on determining that the rating period corresponds to a current time period.

11. The computer-readable medium of claim 8, where the one or more instructions, that cause the one or more processors to provide the advertisement map, cause the one or more instructions to:
   provide the advertisement map to the dynamic advertisement insertion system to cause the dynamic advertisement insertion system to play the program and the new advertisement via a video on demand (VOD) system.

12. The computer-readable medium of claim 8, where the one or more instructions, that cause the one or more processors to determine the time break, cause the one or more processors to:
   determine a starting time associated with the time break as measured from a start of the program; and
   determine an ending time associated with the time break as measured from the start of the program.

13. The computer-readable medium of claim 8,
where the one or more instructions further cause the one or more processors to:
   determine a program identifier associated with the program, and
where the one or more instructions, that cause the one or more processors to determine the advertisement map, cause the one or more processors to:
   determine the advertisement map based on the program identifier and based on the time break.

14. The computer-readable medium of claim 8, where the scheduling information comprises a Cable Computerized Management Systems ("CCMS") schedule.

15. A method, comprising:
receiving, by a device, scheduling information associated with a video program,
   the video program including an advertisement;
determining, by the device, that the advertisement does not need to be assessed for viewership during a rating period;
determining, by the device, a time break, corresponding to the advertisement, associated with the video program based on the scheduling information and based on determining that the advertisement does not need to be assessed for viewership during the rating period;
identify a cue tone that indicates a time, during the time break, when the advertisement was previously displayed; and
modifying, by the device, an advertisement map, associated with a dynamic advertisement insertion system, based on the cue tone,
   the advertisement map including information that identifies the time break and the video program, and
   modifying the advertisement map permitting the dynamic advertisement insertion system to replace the advertisement with a new advertisement during a subsequent playing of the video program.

16. The method of claim 15, where modifying the advertisement map comprises:
identifying the new advertisement; and
modifying the advertisement map to permit the dynamic advertisement insertion system to replace the advertisement with the new advertisement.

17. The method of claim 16, where identifying the new advertisement comprises:
identifying the new advertisement based on a geographic location of a user device associated with the subsequent playing of the video program.

18. The method of claim 15, further comprising:
identifying a program identifier associated with the video program,
   where modifying the advertisement map comprises:
      modifying the advertisement map to permit the dynamic advertisement insertion system to play the video program based on identifying the video program with the program identifier.

19. The method of claim 15,
where the advertisement map is a first advertisement map, and
where modifying the advertisement map comprises:
   replacing the first advertisement map with a second advertisement map, the second advertisement map including information that identifies the time break and the video program.

20. The method of claim 15, further comprising:

receiving, by the device, guide information associated with the video program,
 where the guide information comprises a broadcast schedule associated with a plurality of video programs that include the video program, and
 where modifying the advertisement map is further based on the guide information.

* * * * *